United States Patent
Chung et al.

(10) Patent No.: US 12,421,641 B2
(45) Date of Patent: Sep. 23, 2025

(54) LAUNDRY TREATMENT APPLIANCE AND METHOD OF USING THE SAME ACCORDING TO MATCHED LAUNDRY LOADS

(71) Applicant: Haier US Appliance Solutions, Inc., Wilmington, DE (US)

(72) Inventors: MyungGeon Chung, Seoul (KR); Hyeonsoo Moon, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 404 days.

(21) Appl. No.: 17/969,020

(22) Filed: Oct. 19, 2022

(65) Prior Publication Data

US 2024/0133100 A1 Apr. 25, 2024
US 2024/0229319 A9 Jul. 11, 2024

(51) Int. Cl.
*D06F 34/18* (2020.01)
*D06F 23/04* (2006.01)
(Continued)

(52) U.S. Cl.
CPC .............. *D06F 34/18* (2020.02); *D06F 23/04* (2013.01); *D06F 33/32* (2020.02); *D06F 34/04* (2020.02);
(Continued)

(58) Field of Classification Search
CPC .. D06F 33/32; D06F 2101/02; D06F 2103/02; D06F 2103/04; G06V 10/82; G06V 20/60; G06V 20/50
See application file for complete search history.

(56) References Cited

U.S. PATENT DOCUMENTS 10,121,287 B2  11/2018  Amin
10,466,665 B2 * 11/2019  Belveal ................... D06F 35/00
(Continued)

FOREIGN PATENT DOCUMENTS

CN  107967643 A  4/2018
CN  113201905 A  8/2021
(Continued)

OTHER PUBLICATIONS

Liz Stinson, "Concept: A Service That Pays You to Wash Your Neighbor's Underwear" Wired, Sep. 9, 2012, https://www.wired.com/2013/09/concept-a-service-that-pays-you-to-wash-your-neighbors-underwear/.*

*Primary Examiner* — Amandeep Saini
*Assistant Examiner* — Jaspreet Kaur
(74) *Attorney, Agent, or Firm* — Dority & Manning, P.A.

(57) ABSTRACT

A laundry treatment appliance includes a cabinet; a wash tub; a wash basket; and a controller provided within the cabinet to direct a laundry operation. The laundry operation includes receiving a plurality of wash requests from a plurality of unique users, wherein each wash request of the plurality of wash requests comprises an image of a unique laundry load; analyzing, by one or more computing devices using a machine learning image recognition model, each image to evaluate one or more laundry load characteristics of a first unique laundry load and a second unique laundry load; matching a first unique user and a second unique user from the plurality of users, the first user and the second user having a matching laundry load characteristic from the one or more laundry load characteristics; and generating a joint washing cycle subsequent to matching the first and second unique users.

19 Claims, 4 Drawing Sheets

(51) Int. Cl.
*D06F 33/32* (2020.01)
*D06F 34/04* (2020.01)
*G06V 10/82* (2022.01)
*G06V 20/50* (2022.01)
*G06V 20/60* (2022.01)
*D06F 101/02* (2020.01)

(52) U.S. Cl.
CPC .............. *G06V 10/82* (2022.01); *G06V 20/50* (2022.01); *G06V 20/60* (2022.01); *D06F 2101/02* (2020.02)

(56) References Cited

U.S. PATENT DOCUMENTS

2017/0083885 A1   3/2017  Khadgi
2021/0062397 A1*  3/2021  Cha ........................ D06F 39/02
2022/0195652 A1*  6/2022  Hombroek .............. D06F 33/32

FOREIGN PATENT DOCUMENTS

EP          3751454 A1 * 12/2020 ............. D06F 33/36
JP          2020101861 A    7/2020
WO   WO2018077055 A1    5/2018

* cited by examiner

LAUNDRY TREATMENT APPLIANCE AND METHOD OF USING THE SAME ACCORDING TO MATCHED LAUNDRY LOADS

FIELD OF THE INVENTION

The present subject matter relates generally to laundry treatment appliances, and more particularly to commercial laundry treatment appliances capable of receiving multiple users' laundry.

BACKGROUND OF THE INVENTION

Conventional laundry treatment appliances typically include a wash tub for holding water and a wash basket rotatably provided within the wash tub. Articles to be washed, such as clothing, bedding, towels, and the like, are placed within the wash basket where water and detergent are supplied to perform a washing operation. Some users of laundry treatment appliances utilize large scale facilities, such as public laundromats. These laundromats include multiple machines including washing machines and dryers. Each washing (or drying) operation performed within a machine carries a cost. Oftentimes, this cost is a fixed fee, regardless of the size of the load, the amount of water used, and other factors.

In many washing operations, users will separate out articles to be washed into like categories, such as delicates, whites, colors, sheets, and the like. This may result in some washing loads to be lighter or smaller than others. For instance, a single user may only own a few items deemed delicate, which may not be enough to justify running an entire washing operation. For instance, a user may not wish to pay a fee for a full operating cycle of the appliance when only a fraction of its capacity is used. Moreover, energy and resources such as water would be wasted in performing large washing operations with fractional washing loads.

Accordingly, a laundry treatment appliance that obviates one or more of the above-mentioned drawbacks would be beneficial. In particular, a laundry treatment appliance capable of accepting multiple different washing loads and distributing cost evenly would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a laundry treatment appliance is provided. The laundry treatment appliance may include a cabinet defining a receiving space; a wash tub provided within the receiving space; a wash basket received within the wash tub; and a controller provided within the cabinet, the controller being configured to direct a laundry operation. The laundry operation may include receiving a plurality of wash requests from a plurality of unique users, wherein each wash request of the plurality of wash requests includes an image of a unique laundry load; analyzing, by one or more computing devices using a machine learning image recognition model, a first image to evaluate one or more laundry load characteristics of a first unique laundry load; analyzing, by the one or more computing devices using the machine learning image recognition model, a second image to evaluate one or more laundry load characteristics of a second unique laundry load; matching a first unique user and a second unique user from the plurality of users, the first user and the second user having a matching laundry load characteristic from the one or more laundry load characteristics; and generating a joint washing cycle subsequent to matching the first and second unique users based on the matching laundry load characteristics.

In another exemplary aspect of the present disclosure, a method of operating a laundry treatment appliance is provided. The method may include receiving wash requests from a plurality of unique users, wherein each of the wash requests includes an image of a unique laundry load; analyzing, by one or more computing devices using a machine learning image recognition model, a first image to evaluate one or more laundry load characteristics of a first unique laundry load; analyzing, by the one or more computing devices using the machine learning image recognition model, a second image to evaluate one or more laundry load characteristics of a second unique laundry load; matching a first unique user and a second unique user from the plurality of users, the first user and the second user having a matching laundry load characteristic from the one or more laundry load characteristics; determining a first unique laundry load size of the first unique user, the first unique laundry load size being determined within the wash basket; determining a second unique laundry load size of the second unique user, the second unique laundry load size being determined within the wash basket after determining the first unique laundry load size; and generating a joint washing cycle subsequent to determining the first and second laundry load sizes, the joint washing cycle being based on the matching laundry load characteristics.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
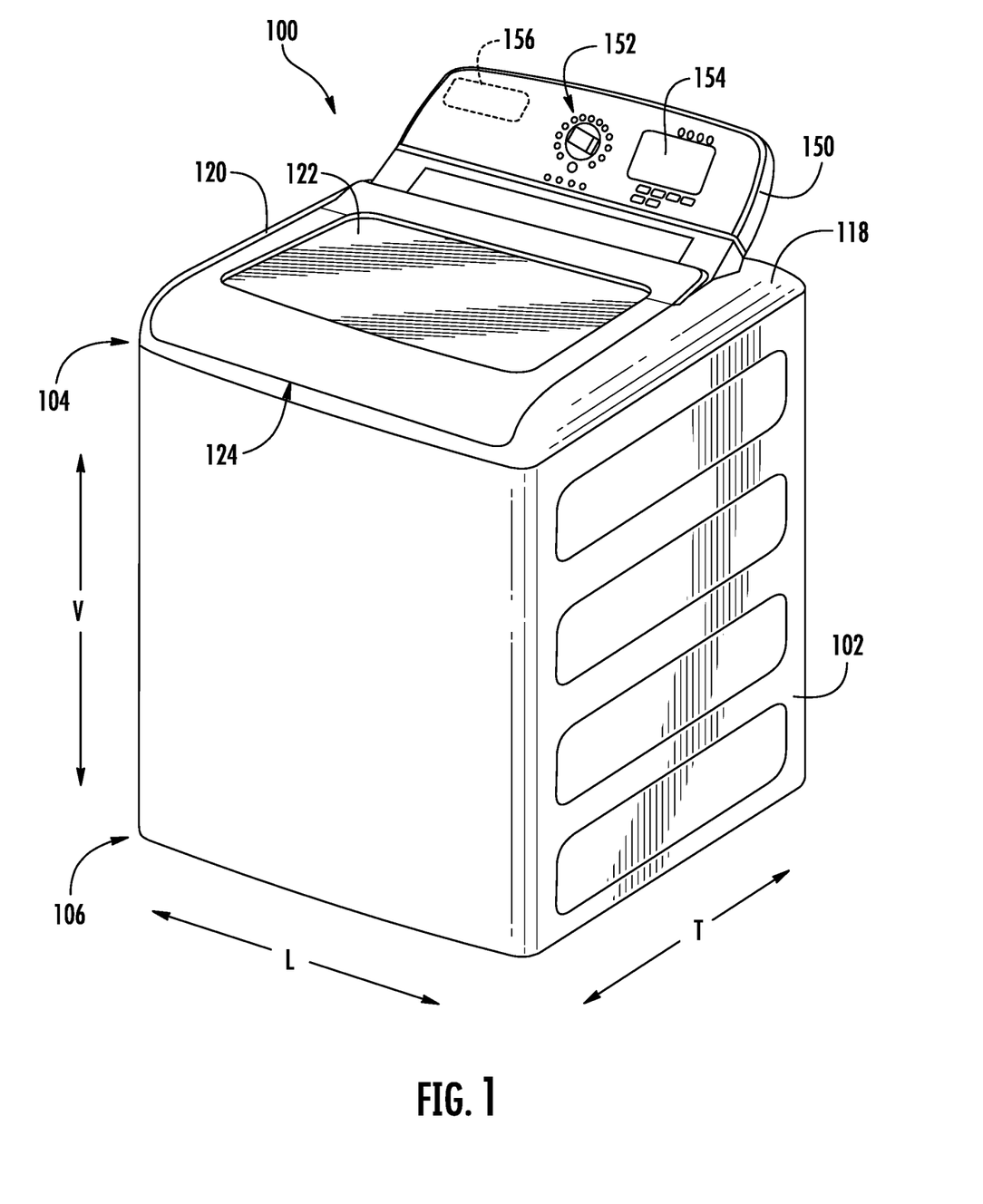
FIG. 1 provides a perspective view of a laundry machine appliance with a lid in a closed position according to exemplary embodiments of the present disclosure.
Figure 2:
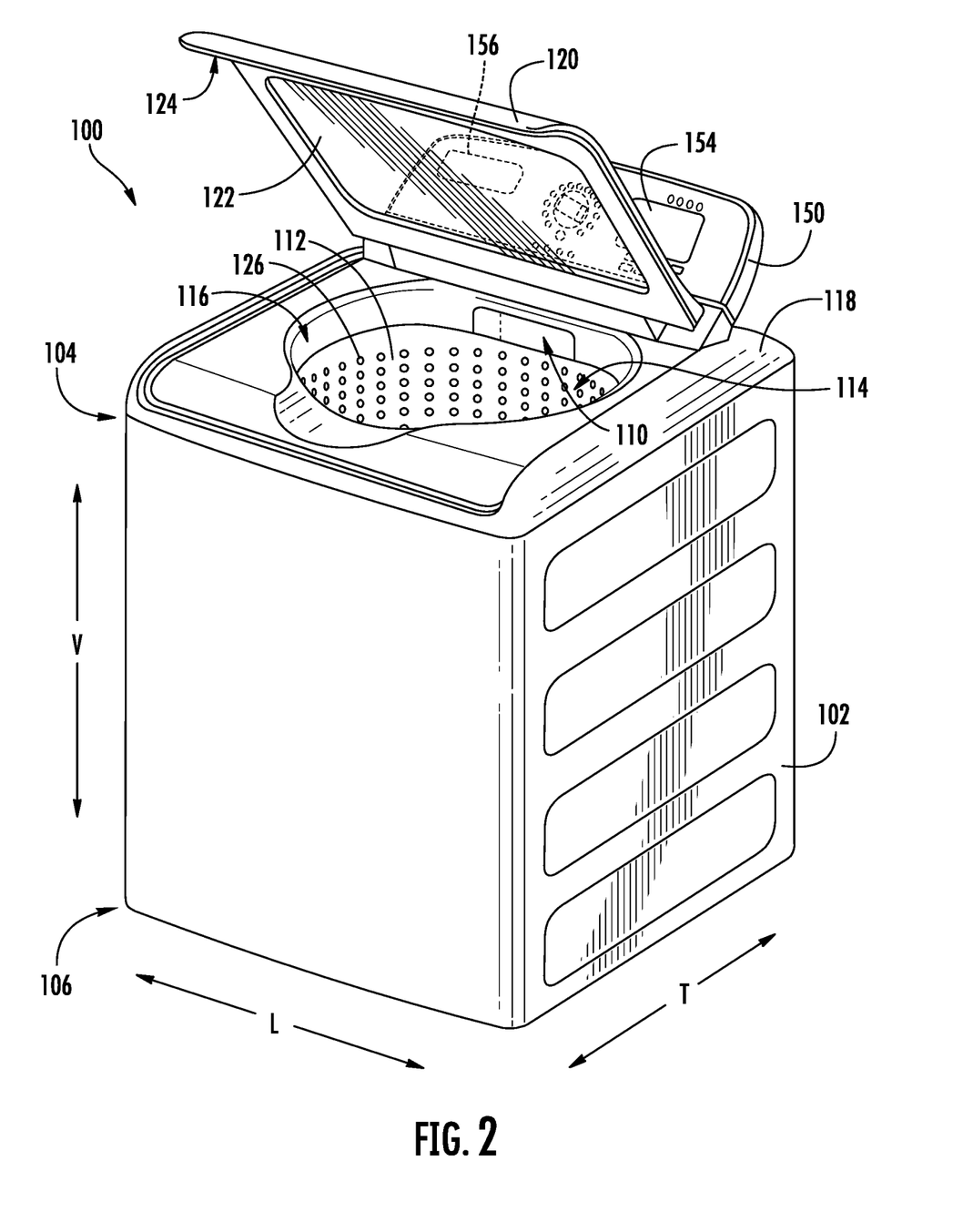
FIG. 2 provides a perspective view of the exemplary laundry machine appliance of FIG. 1 with the lid in an open position.
Figure 3:
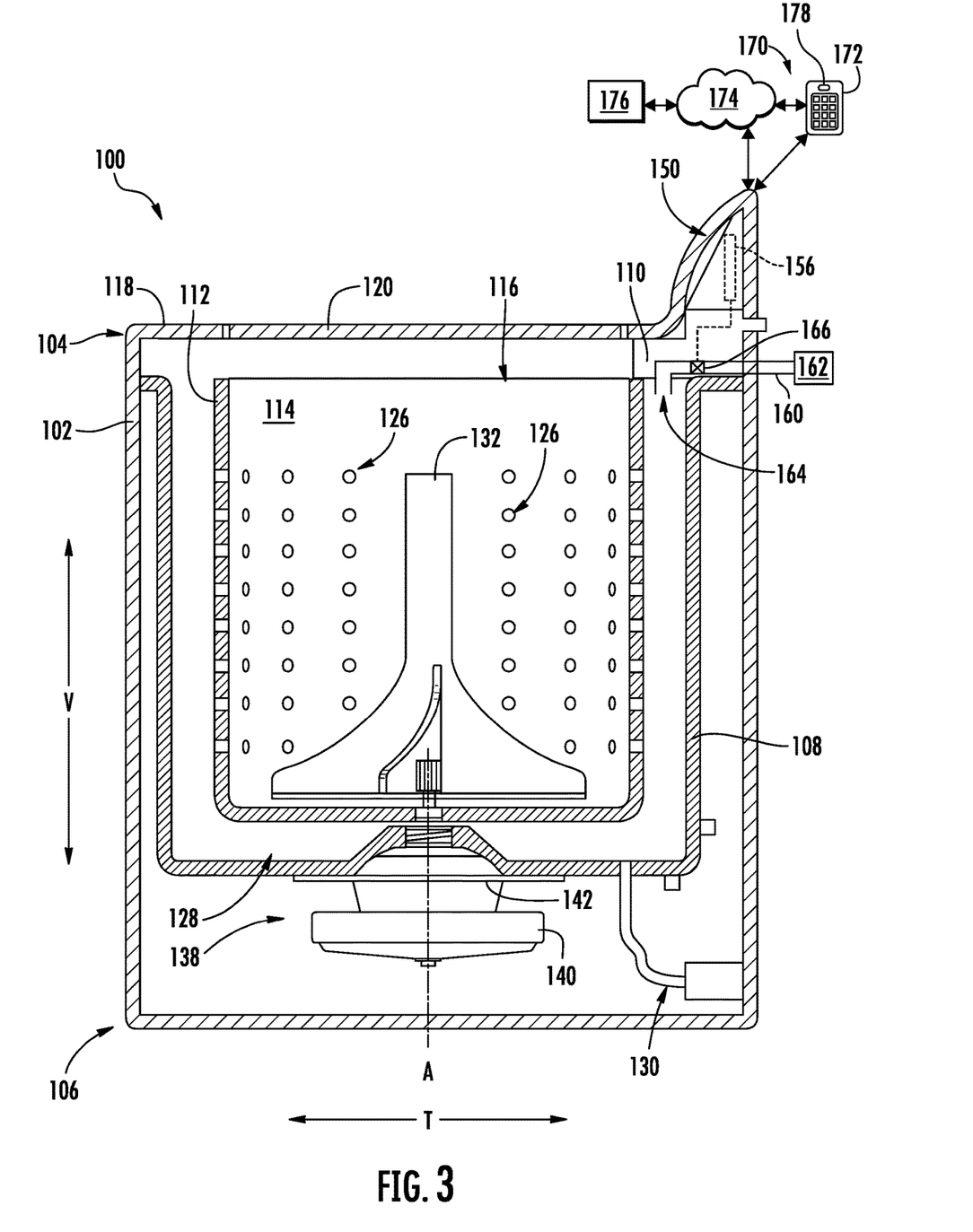
FIG. 3 provides a cut-away side view of the exemplary laundry machine appliance of FIG. 1.

FIGS. 1 through 3 illustrate an exemplary embodiment of a vertical axis laundry machine appliance or laundry treatment appliance (e.g., such as a washing machine) 100. Specifically, FIGS. 1 and 2 illustrate perspective views of laundry machine appliance 100 in a closed and an open position, respectively. FIG. 3 provides a side cross-sectional view of laundry machine appliance 100. Laundry machine appliance 100 generally defines a vertical direction V, a lateral direction L, and a transverse direction T, each of which is mutually perpendicular, such that an orthogonal coordinate system is generally defined.

While described in the context of a specific embodiment of a vertical axis laundry machine, it should be appreciated that vertical axis laundry machine appliance 100 is provided by way of example only. It will be understood that aspects of the present subject matter may be used in any other suitable laundry machine appliance, such as a horizontal axis laundry machine appliance. Indeed, modifications and variations may be made to laundry machine appliance 100, including different configurations, different appearances, and/or different features while remaining within the scope of the present subject matter. For instance, laundry machine appliance 100 may be a combination washing machine and dryer appliance, a stand-alone washing machine, a dryer, or any suitable appliance capable of performing a laundry operation on a laundry load.

Laundry machine appliance 100 has a cabinet 102 that extends between a top portion 104 and a bottom portion 106 along the vertical direction V. As best shown in FIG. 3, a tub 108 is positioned within cabinet 102 and is generally configured for retaining wash fluids during an operating cycle (e.g., a washing cycle). Laundry machine appliance 100 further includes a primary dispenser 110 (FIG. 2) for dispensing wash fluid into tub 108. The term "wash fluid" refers to a liquid used for washing and/or rinsing articles during an operating cycle and may include any combination of water, detergent, fabric softener, bleach, and other wash additives or treatments. Further, it should be noted that primary dispenser 110 is provided by way of example only, and that laundry machine appliance 100 may incorporate any suitable form of detergent dispenser, including manual fill dispensers.

In addition, laundry machine appliance 100 may include one or more wash baskets 112 selectively positioned within tub 108 and generally defining one or more wash chambers 114. For instance, an opening 116 may be formed in cabinet 102 for receipt of articles for washing (e.g., for receipt of one or more removable wash baskets). More specifically, wash basket 112 (e.g., one or more) may be rotatably mounted within tub 108 such that it is rotatable about an axis of rotation A. According to the illustrated embodiment, the axis of rotation A is substantially parallel to the vertical direction V. In this regard, laundry machine appliance 100 is generally referred to as a "vertical axis" or "top load" laundry machine appliance 100. However, as noted above, it should be appreciated that aspects of the present subject matter may be used within the context of a "horizontal axis" or "front load" laundry machine appliance as well.

As illustrated, cabinet 102 of laundry machine appliance 100 has a top panel 118. Top panel 118 may define opening 116 to permit a user access to tub 108. Laundry machine appliance 100 may further include a door 120 which is rotatably mounted to top panel 118 to permit selective access to opening 116. In particular, door 120 may selectively rotate between the closed position (as shown in FIGS. 1 and 3) and the open position (as shown in FIG. 2). In the closed position, door 120 inhibits access to tub 108 (and, selectively, one or more wash baskets 112). Conversely, in the open position, a user can access wash basket 112. A window 122 in door 120 may permit viewing of wash basket 112 when door 120 is in the closed position, e.g., during operation of laundry machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 112 further defines a plurality of perforations 126 to facilitate fluid communication between an interior of wash basket 112 and tub 108. In this regard, wash basket 112 is spaced apart from tub 108 to define a space for wash fluid to escape wash chamber 114. During a spin cycle, wash fluid within articles of clothing and within wash chamber 114 is urged through perforations 126 wherein it may collect in a sump 128 defined by tub 108. Laundry machine appliance 100 may further include a pump assembly 130 (FIG. 3) that is located beneath tub 108 and wash basket 112 for gravity assisted flow when draining tub 108, e.g., after a wash or rinse cycle.

An impeller or agitator 132 (FIG. 3), such as a vane agitator, impeller, auger, oscillatory basket mechanism, or some combination thereof may be disposed in wash basket 112 to impart an oscillatory motion to articles and liquid in wash basket 112. More specifically, agitator 132 may extend into wash basket and assists agitation of articles disposed within wash basket 112 during operation of laundry machine appliance 100, e.g., to facilitate improved cleaning. In different embodiments, agitator 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitator 132 and wash basket 112 are oriented to rotate about the axis of rotation A (which is substantially parallel to vertical direction V). The agitator shown in FIG. 3 (agitator 132) is merely an example, and any suitable agitator may be incorporated.

As best illustrated in FIG. 3, laundry machine appliance 100 includes a drive assembly 138 in mechanical communication with wash basket 112 to selectively rotate wash basket 112 (e.g., during an agitation or a rinse cycle of laundry machine appliance 100). In addition, drive assembly 138 may also be in mechanical communication with agitator 132. In this manner, drive assembly 138 may be configured for selectively rotating or oscillating wash basket 112 and/or agitator 132 during various operating cycles of laundry machine appliance 100.

More specifically, drive assembly 138 may generally include one or more of a drive motor 140 and a transmission assembly 142, e.g., such as a clutch assembly, for engaging and disengaging wash basket 112 and/or agitator 132. According to the illustrated embodiment, drive motor 140 is a brushless DC electric motor, e.g., a pancake motor. However, according to alternative embodiments, drive motor 140 may be any other suitable type of motor. For example, drive motor 140 may be an AC motor, an induction motor, a permanent magnet synchronous motor, or any other suitable type of motor. In addition, drive assembly 138 may include any other suitable number, types, and configurations of support bearings or drive mechanisms.

Laundry appliance 100 may include one or more sensors or means for determining a laundry load size provided within wash basket 112. According to one example, a laundry load size or weight may be determined by driving drive motor 140 at a predetermined speed and detecting a basket speed and load output of drive motor 140. For instance, obtaining the basket speed of the wash basket may include measuring a motor frequency, a back electromotive force (EMF) on the motor, or a motor shaft speed (e.g., using a tachometer). It should be appreciated that other systems and methods for monitoring motor power and/or basket speeds may be used while remaining within the scope of the present subject matter.

Referring to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of laundry machine appliance 100 is controlled by a controller or processing device 156 that is communicatively coupled with control panel 150 for user manipulation to select washing machine cycles and features. In response to user manipulation of control panel 150, controller 156 operates the various components of laundry machine appliance 100 to execute selected machine cycles and features. Controller 156 may include a memory and microprocessor, such as a general or special purpose microprocessor operable to execute programming instructions or microcontrol code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of laundry machine appliance 100 may be in communication with controller 156 via one or more signal lines or shared communication busses.

Referring to FIG. 3, laundry machine appliance 100 includes a water supply conduit 160 that provides fluid communication between a water supply source 162 (such as a municipal water supply) and a discharge nozzle 164 for directing a flow of water into tub 108, and more specifically, into wash chamber 114. In addition, laundry machine appliance 100 includes a water fill valve or water control valve 166 which is fluidly coupled with water supply conduit 160 and communicatively coupled to controller 156. In this manner, controller 156 may regulate the operation of water control valve 166 to regulate the amount of water within tub 108.

Laundry appliance 100 may include a camera assembly configured to capture one or more images of an interior of wash basket 112. Controller 156 may be programmed or configured for analyzing the images obtained by the camera assembly, e.g., in order to determine the level or amount of a laundry load provided within wash chamber 114 or other cycle information, and may use this information to make informed decisions (e.g., regarding the operation of washing machine appliance 100 or regarding details of the laundry loads provided therein). For instance, the camera assembly may include one or more digital cameras capable of capturing still images, video images, or the like. The camera assembly may be attached to cabinet 102, door 120, or the like. As such, the camera may be provided within wash chamber 114, external to appliance 100, or any other suitable location.

Referring still to FIG. 3, a schematic diagram of an external communication system 170 will be described according to an exemplary embodiment of the present subject matter. In general, external communication system 170 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 170 may be used to transfer data or other information to improve performance of one or more external devices or appliances and/or improve user interaction with such devices.

For example, external communication system 170 permits controller 156 of appliance 100 to communicate with a separate device (or multiple separate devices) external to appliance 100, referred to generally herein as an external device 172. For instance, multiple external devices 172 (e.g., a first mobile device belonging to a first user, a second mobile device belonging to a second user, etc.) may selectively communicate with appliance 100 via external communication system 170. As described in more detail below, these communications may be facilitated using a wired or wireless connection, such as via a network 174. In general, one or more external devices 172 may include any suitable devices separate from appliance 100 that are configured to provide and/or receive communications, information, data, or commands from a user or users. In this regard, external device 172 may be, for example, a personal phone, a smartphone, a tablet, a laptop or personal computer, a wearable device, a smart home system, or another mobile or remote device. Additionally or alternatively, external device 172 may include a camera 178. Camera 178 may be configured to capture one or more images (e.g., still images, video clips, burst images, etc.). According to at least one embodiment, camera 178 may be configured to selectively capture one or more images of an interior (e.g., wash chamber 114) of laundry machine appliance 100.

In addition, a remote server 176 may be in communication with appliance 100 and/or external device 172 through network 174. In this regard, for example, remote server 176 may be a cloud-based server, and thus may be located at a distant location, such as in a separate state, country, etc. According to an exemplary embodiment, external device 172 communicates with a remote server 176 over network 174, such as the Internet, to transmit/receive data or information, provide user inputs, receive user notifications or instructions, interact with or control appliance 100, etc. In addition, external device 172 and remote server 176 may communicate with appliance 100 to communicate similar information.

In general, communication between appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 4:
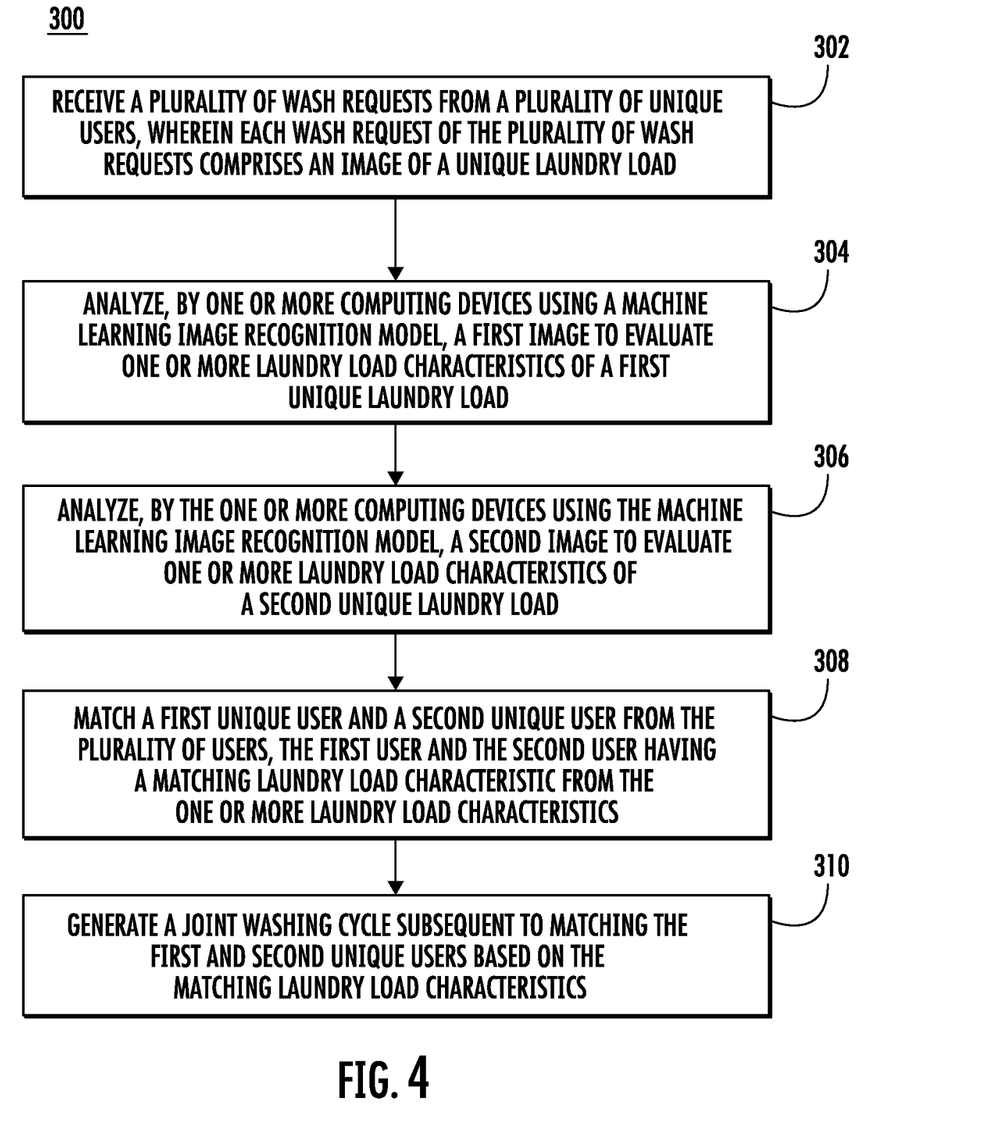
FIG. 4 provides a flow chart illustrating a method of operating a laundry machine appliance.

FIG. 4 provides a flowchart illustrating a method 300 of operating a laundry machine (e.g., laundry machine 100) according to an exemplary embodiment of the present disclosure. FIG. 4 provides a non-exhaustive method of operation, and the method may include more or fewer steps than shown in FIG. 4, according to specific embodiments. Advantageously, according to method 300, multiple users may utilize a single laundry treatment appliance and have a cost automatically divided between them.

At step 302, method 300 may include receiving a plurality of wash requests from a plurality of unique users (e.g., two or more, three or more, etc.). The wash requests may include one or more corresponding wash parameters. For instance, the one or more wash parameters may include a laundry load type, a water temperature, a cycle request, or the like. Each of the plurality of users may utilize a mobile application (app) to input a unique wash request. The unique wash request may be received by a controller, for instance. The controller may be provided within the laundry appliance or may be located on a remote server.

Each of the plurality of wash requests may include an image of a unique laundry load. For example, a first unique user inputs a first wash request including a first unique image of a first unique laundry load (e.g., belonging to the first unique user). In detail, the first unique user may capture an image (e.g., via a remote device) and upload the captured image (e.g., the first unique image) to a profile associated with the first unique user. A second unique user may input a second wash request including a second unique image of a second unique laundry load (e.g., belonging to the second unique user). Similarly, the second unique user may capture an image (e.g., via a remote device) and upload the captured image (e.g., the second unique image) to a profile associated with the second unique user. It should be understood that three or more users may also provide wash requests.

At step 304, method 300 may include analyzing the first unique image to evaluate one or more laundry load characteristics of the first unique laundry load. For instance, the analysis of the first unique image may be performed by one or more computing devices using a machine learning image recognition model. It should be appreciated that any suitable image processing or recognition method may be used to analyze the first unique image obtained at step 302 and facilitate evaluation of the one or more laundry load characteristics. In addition, it should be appreciated that this image analysis or processing may be performed locally (e.g., by a controller on a corresponding external device) or remotely (e.g., by controller 156 or a remote server).

According to exemplary embodiments of the present subject matter, step 304 of analyzing the plurality of unique images may include analyzing the image(s) of the unique laundry loads using a neural network classification module and/or a machine learning image recognition process. In this regard, for example, the controller may be programmed to implement the machine learning image recognition process that includes a neural network trained with a plurality of images of laundry loads including various colors, garments, sizes, shapes, etc. By analyzing the image(s) captured using this machine learning image recognition process, the controller may properly evaluate the one or more laundry load characteristics, e.g., by identifying the trained image that is closest to the obtained image.

As used herein, the terms image recognition process and similar terms may be used generally to refer to any suitable method of observation, analysis, image decomposition, feature extraction, image classification, etc. of one or more images or videos taken of laundry loads. In this regard, the image recognition process may use any suitable artificial intelligence (AI) technique, for example, any suitable machine learning technique, or for example, any suitable deep learning technique. It should be appreciated that any suitable image recognition software or process may be used to analyze obtained images and the controller may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular region containing laundry, garments, or the like. In this regard, a "region proposal" may be regions in an image that could belong to a particular object, such as a particular shape of a laundry load, washing articles, or the like. A convolutional neural network may then be used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "Mask R-CNN" and the like.

According to still other embodiments, the image recognition process may use any other suitable neural network process. For example, step 304 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the conv5 property map instead of the initially split into zone recommendations. In addition, according to exemplary embodiments standard CNN may be used to analyze the image to determine various attributes or characteristics of the laundry load. In addition, a K-means algorithm may be used. Other image recognition processes are possible and within the scope of the present subject matter.

It should be appreciated that any other suitable image recognition process may be used while remaining within the scope of the present subject matter. For example, step 304 may include using a deep belief network ("DBN") image recognition process. A DBN image recognition process may generally include stacking many individual unsupervised networks that use each network's hidden layer as the input for the next layer. According to still other embodiments, step 304 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

As such, in analyzing the first unique image, the image recognition process may determine one or more colors within the laundry load (e.g., the first unique laundry load). For instance, the image recognition process may determine that the first unique laundry load includes 3 or more different colored garments. The image recognition model may then determine that at least a predetermined percentage of the laundry load (e.g., the space occupied within the image determined to be laundry) is a color other than white (e.g., thus determining that the first unique laundry load is a colored load). For instance, the predetermined percentage may be between about 75% and about 85% percent. Accordingly, the image recognition model may determine that the first unique laundry load is at least 75% to 85% colored other than white and classify the first unique laundry load as a colored load. As would be understood, if the image recognition model determines that at least the predetermined percentage of the laundry load is white, the laundry load (e.g., first unique laundry load) may be classified as a whites load.

After determining the category of the first unique laundry load, the method 300 may include concealing the first laundry load in the first unique image with a first reference image. In detail, upon classifying the first unique laundry load as a colored laundry load, the colored portion of the first unique laundry load may be virtually or graphically covered within the first unique image (e.g., before the image is stored and subsequently displayed to other potential unique users for matching). The first reference image may be a preselected solid color to cover the individual laundry garments provided in the picture. For instance, the image recognition model (or the controller) may cover all colored portions of the first unique laundry load in the first unique image with a first color and may cover all white portions with a second color different from the first color. Advantageously, other unique users may be able to determine the type of laundry load in the first unique image according to the concealing image (e.g., color) on the image. Additionally or alternatively, the first unique user may have their laundry garments concealed when the first unique image is released or presented to a potential match.

At step 306, method 300 may include analyzing the second unique image to evaluate one or more laundry load characteristics of the second unique laundry load. For instance, the analysis of the second unique image may be performed by one or more computing devices using a machine learning image recognition model (e.g., the one or more computing devices using the machine learning image recognition model discussed above). It should be appreciated that any suitable image processing or recognition method may be used to analyze the second unique image (e.g., similar to the first unique image) obtained at step 302 and facilitate evaluation of the one or more laundry load characteristics. In addition, it should be appreciated that this image analysis or processing may be performed locally (e.g., by a controller on a corresponding external device) or remotely (e.g., by controller 156 or a remote server).

As such, in analyzing the second unique image, the image recognition process may determine one or more colors within the laundry load (e.g., the second unique laundry load). For instance, the image recognition process may determine that the second unique laundry load includes 3 or more different colored garments. The image recognition model may then determine that at least a predetermined percentage of the second laundry load (e.g., the space occupied within the image determined to be laundry) is a color other than white (e.g., thus determining that the second unique laundry load is a colored load). For instance, the predetermined percentage may be between about 75% and about 85% percent. Accordingly, the image recognition model may determine that the second unique laundry load is at least 75% to 85% colored other than white and classify the second unique laundry load as a colored load. As would be understood, if the image recognition model determines that at least the predetermined percentage of the laundry load is white, the laundry load (e.g., second unique laundry load) may be classified as a whites load.

After determining the category of the second unique laundry load, the method 300 may include concealing the second laundry load in the second unique image with a second reference image. For instance, similar to the first reference image, upon classifying the second unique laundry load as a colored laundry load, the colored portion of the second unique laundry load may be virtually or graphically covered within the second unique image (e.g., before the image is stored and subsequently displayed to other potential unique users for matching). The second reference image may be a preselected solid color to cover the individual laundry garments provided in the picture. For instance, the image recognition model (or the controller) may cover all colored portions of the second unique laundry load in the second unique image with a first color (e.g., the same first color as in the first unique image) and may cover all white portions with a second color different from the first color. Advantageously, other unique users may be able to determine the type of laundry load in the second unique image according to the concealing image (e.g., color) on the image. Additionally or alternatively, the second unique user may have their laundry garments concealed when the second unique image is released or presented to a potential match.

At step 308, method 300 may include matching the first unique user and the second unique user from the plurality of users. The first and second unique users may have at least one matching laundry load characteristic from the one or more laundry load characteristics. For instance, after analyzing each of the first and second unique images (and additional potential unique images), at least two matches (e.g., the first unique user and the second unique user) may be matched to perform a joint washing cycle. Each of (or one of) the first unique user and the second unique user may then set an appropriate date and time to meet to perform the joint washing cycle.

Additionally or alternatively, the method 300 may present the first or second unique user with a list of potential matches. For instance, two or more unique users having common wash parameters (and/or potentially complementary laundry load sizes) may be presented to the first or second unique user. The first or second unique user may then select a desired match with which to perform the joint washing cycle (e.g., a user with whom the first or second unique user had already matched previously). Thus, the first or second unique user may (e.g., via the mobile app) select the desired user with whom to perform the joint washing cycle. Moreover, unique users may establish connections according to successful operations. The controller may store this information and alert connected matches as to another connected match's desire to perform a joint washing cycle.

At step 310, method 300 may include generating the joint washing cycle subsequent to matching the first and second unique users based on the matching laundry load characteristics. In response to matching the first unique user and the second unique user, the controller may generate the joint washing operation, including the wash parameters input and/or determined. The joint washing operation may include the total amount of water to be used, a number of cycles to perform (e.g., fill cycles, agitation cycles, drain cycles, rinse cycles, spin cycles, etc.), oscillation or rotation speed (e.g., of an agitator or wash basket), etc. The joint washing operation may then be stored, for instance, within the controller. In at least some embodiments, the joint washing operation is stored within the controller on board the washing machine.

The first and second unique users may meet at a selected location (e.g., laundromat) to initiate the joint washing cycle. Accordingly, method 300 may include receiving the first unique laundry load within the wash basket of the laundry treatment appliance. In detail, the first unique user may insert their first unique laundry load into the wash basket. After inserting the laundry load, the first unique user may then capture (e.g., via the smartphone or mobile device and using the mobile app) a first laundry load image of the first unique laundry load within the wash basket. The first laundry load image may then be analyzed (e.g., by the one or more computing devices using the machine learning image recognition model described above). A first occupied space within the wash basket may then be determined (e.g., by the image recognition model). The first occupied space may be a predetermined percentage of a total volume within the wash basket. Accordingly, the image recognition model may determine a first unique laundry load size.

After determining the first unique laundry load size, the method 300 may include receiving the second unique laundry load within the wash basket of the laundry treatment appliance. In detail, the second unique user may insert their second unique laundry load into the wash basket. After inserting the laundry load, the second unique user may then capture (e.g., via the smartphone or mobile device and using the mobile app) a second laundry load image of the second unique laundry load within the wash basket. The second laundry load image may then be analyzed (e.g., by the one or more computing devices using the machine learning image recognition model described above). A second occupied space within the wash basket may then be determined (e.g., by the image recognition model). The second occupied space may be a predetermined percentage of a total volume within the wash basket including each of the first and second unique laundry loads. Accordingly, the image recognition model may determine a second unique laundry load size. For instance, the image recognition model may subtract the first occupied space or volume from the combined occupied space or volume to obtain the second occupied space or volume and thus the second unique laundry load size.

Upon determining the combined occupied space of the wash basket, the method 300 may include determining a total cost of the joint washing cycle. For instance, a total combined volume, weight, size, or the like may be determined and incorporated into the laundry treatment appliance to determine a total cost of performing the joint washing cycle.

The method 300 may include determining a first individual cost for the first unique user and a second individual cost for the second unique user. In detail, upon determining the total cost of the joint washing cycle, the controller may split the total cost between the first and second unique users. Further to the example given above, the total cost split between the first and second users may be determined according to the individual unique laundry load sizes of each unique user. According to one example, the first unique laundry load size (e.g., weight, size, or volume within the wash basket) of the first unique user is larger than the second unique laundry load size (e.g., weight, size, or volume within the wash basket)) of the second unique user. Accordingly, the first unique user, having the larger laundry load size, would be obligated to pay a larger portion of the total cost compared to the second unique user, having the smaller laundry load size. In at least one embodiment, the first unique user would be assigned a cost that is between about 60% and about 70% of the total cost of the joint washing cycle. Accordingly, the remaining portion would be assigned to the second unique user. Advantageously, the cost of a wash cycle may be automatically (e.g., without direct user intervention or estimation) apportioned and each user may pay a fair share of the total laundry cost according to the amount of laundry included within the joint washing cycle.

The controller may accept payments from each of the first unique user and the second unique user remotely. For instance, a mobile application provided on the mobile device of each unique user may include a virtual payment option. The mobile application may be remotely connected with the laundry appliance. Accordingly, each individual payment from each unique user may be supplied to the laundry appliance together. It should be noted that additional or alternative payment methods may be accepted, such as an on-board cash payment receiver, a credit card receiver, or the like.

The controller may further determine a total amount of water to be used during the joint washing cycle. In determining the total amount of water to be used, the controller may consider one or more of the wash parameters input by the plurality of unique users (e.g., the first and second unique users). For instance, a total combined laundry load size or weight (e.g., a total volume of washing articles) together with a selected cycle or operation (e.g., heavy soil, delicates, bulky, etc.) may determine a total amount of water to be used in the joint washing operation.

The method 300 may include receiving confirmation from each of the first and second unique users. In detail, upon determining the associated individual costs for each unique user, the controller may notify each user of the selected and/or determined options. In at least some embodiments, the laundry appliance sends a notification to each unique user (e.g., via mobile communication). The notification may include all of the determined factors together with a request to confirm the joint washing cycle. Accordingly, each unique user may confirm the scheduled joint washing cycle. For instance, each user may press a button (e.g., on a touchscreen of a connected mobile device) indicating that the joint washing cycle has been confirmed.

The method 300 may include initiating the joint washing cycle. For instance, upon confirming the combined laundry load size, confirming each individual cost, receiving confirmation from each of the first and second unique users, and receiving payment, the laundry appliance may initiate the joint washing cycle according to the wash parameters. Additionally or alternatively, the combined laundry load may have a subsequent joint laundry cycle performed thereto (e.g., a drying cycle). For instance, each of the first and second unique users may be notified of the completion of the joint washing cycle. The first and second unique users may then agree to a subsequent joint drying cycle. According to at least one embodiment, the combined laundry load is moved to a separate laundry appliance (e.g., a dryer), where the previously confirmed unique laundry load weights may be retrieved. Accordingly, individual costs for the joint drying cycle may be calculated using the previously confirmed unique laundry load sizes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry treatment appliance defining a vertical direction, a lateral direction, and a transverse direction, the laundry treatment appliance comprising:
    a cabinet defining a receiving space;
    a wash tub provided within the receiving space;
    a wash basket received within the wash tub; and
    a controller provided within the cabinet, the controller being configured to direct a laundry operation, the laundry operation comprising:
        receiving a plurality of wash requests from a plurality of external devices associated with a plurality of unique users, wherein each wash request of the plurality of wash requests comprises an image of a unique laundry load and one or more wash parameters corresponding to the unique laundry load;
        analyzing, by one or more computing devices using a machine learning image recognition model, a first image to evaluate one or more laundry load characteristics of a first unique laundry load;
        analyzing, by the one or more computing devices using the machine learning image recognition model, a second image to evaluate one or more laundry load characteristics of a second unique laundry load;
        matching a first unique user and a second unique user from the plurality of unique users, the first unique user and the second unique user having a matching laundry load characteristic from the one or more laundry load characteristics;
        generating a joint washing cycle comprising one or more wash parameters corresponding to the unique laundry load subsequent to matching the first and second unique users based on the matching laundry load characteristics; and
        initiating the joint washing cycle at the laundry treatment appliance according to the one or more wash parameters.

2. The laundry treatment appliance of claim 1, wherein the laundry operation further comprises:
    receiving the first unique laundry load within the wash basket;

determining a first unique laundry load size of the first unique laundry load;

receiving the second unique laundry load within the wash basket after determining the first unique laundry load size; and determining a second unique laundry load size of the second unique laundry load.

3. The laundry treatment appliance of claim 2, wherein determining the first and second unique laundry load sizes comprises:

capturing a first laundry load image of the first unique laundry load;

analyzing, by the one or more computing devices using the machine learning image recognition model, the first laundry load image to determine a first occupied space within the wash basket;

capturing a second laundry load image of the first and second unique laundry loads within the wash basket; and analyzing, by the one or more computing devices using the machine learning image recognition model, the second laundry load image to determine a second occupied space within the wash basket.

4. The laundry treatment appliance of claim 3, wherein the laundry operation further comprises:

determining a total cost for the joint washing cycle in response to determining the second occupied space within the wash basket.

5. The laundry treatment appliance of claim 4, wherein the laundry operation further comprises:

determining a first individual cost for the first unique user and a second individual cost for the second unique user after determining the total cost of the joint washing cycle;

receiving a confirmation from each of the first and second unique users; and initiating the joint washing cycle in response to receiving the confirmation from each of the first and second unique users.

6. The laundry treatment appliance of claim 3, wherein the first and second laundry load images are captured by a remote camera outside of the wash basket.

7. The laundry treatment appliance of claim 1, wherein the machine learning image recognition model comprises at least one of a convolution neural network ("CNN"), a region-based convolution neural network ("R-CNN"), a deep belief network ("DBN"), or a deep neural network ("DNN") image recognition process.

8. The laundry treatment appliance of claim 1, wherein the one or more laundry load characteristics comprises a color of the corresponding unique laundry load.

9. The laundry treatment appliance of claim 8, wherein the laundry operation further comprises:

determining, via image analysis on a first unique image, a first unique laundry load is a first color after receiving the plurality of wash requests; and concealing the first unique laundry load in the first unique image with a first reference image in response to determining the first unique laundry load is the first color.

10. The laundry treatment appliance of claim 9, wherein determining the first unique laundry load is the first color comprises:

determining that at least 80% of the first unique laundry load in the first unique image is not white.

11. A method of operating a laundry treatment appliance, the laundry treatment appliance comprising a wash basket for receiving one or more laundry loads, the method comprising:

receiving a plurality of wash requests from a plurality of external devices associated with a plurality of unique users, wherein each of the wash requests of the plurality of wash requests comprises an image of a unique laundry load;

analyzing, by one or more computing devices using a machine learning image recognition model, a first image to evaluate one or more laundry load characteristics of a first unique laundry load;

analyzing, by the one or more computing devices using the machine learning image recognition model, a second image to evaluate one or more laundry load characteristics of a second unique laundry load;

matching a first unique user and a second unique user from the plurality of unique users, the first unique user and the second unique user having a matching laundry load characteristic from the one or more laundry load characteristics;

determining a first unique laundry load size of the first unique user, the first unique laundry load size being determined within the wash basket;

determining a second unique laundry load size of the second unique user, the second unique laundry load size being determined within the wash basket after determining the first unique laundry load size;

generating a joint washing cycle comprising one or more wash parameters corresponding to the first unique laundry load and the second unique laundry load subsequent to determining the first and second laundry load sizes, the joint washing cycle being based on the matching laundry load characteristics; and initiating the joint washing cycle at the laundry treatment appliance according to the one or more wash parameters.

12. The method of claim 11, wherein determining the first and second unique laundry load sizes comprises:

receiving the first unique laundry load within the wash basket;

capturing a first laundry load image of the first unique laundry load;

analyzing, by the one or more computing devices using the machine learning image recognition model, the first laundry load image to determine a first occupied space within the wash basket;

receiving the second unique laundry load within the wash basket after determining the first unique laundry load size;

capturing a second laundry load image of the first and second unique laundry loads within the wash basket; and analyzing, by the one or more computing devices using the machine learning image recognition model, the second laundry load image to determine a second occupied space within the wash basket.

13. The method of claim 12, wherein the laundry operation further comprises:

determining a total cost for the joint washing cycle in response to determining the second occupied space within the wash basket.

14. The method of claim 13, wherein the laundry operation further comprises:

determining a first individual cost for the first unique user and a second individual cost for the second unique user after determining the total cost of the joint washing cycle;

receiving a confirmation from each of the first and second unique users; and initiating the joint washing cycle in response to receiving the confirmation from each of the first and second unique users.

15. The method of claim 12, wherein the first and second laundry load images are captured by a remote camera outside of the wash basket.

16. The method of claim 11, wherein the machine learning image recognition model comprises at least one of a convolution neural network ("CNN"), a region-based convolution neural network ("R-CNN"), a deep belief network ("DBN"), or a deep neural network ("DNN") image recognition process.

17. The method of claim 11, wherein the one or more laundry load characteristics comprises a color of the corresponding unique laundry load.

18. The method of claim 17, wherein the laundry operation further comprises:

determining, via image analysis on a first unique image, a first unique laundry load is a first color after receiving the plurality of wash requests; and concealing the first unique laundry load in the first unique image with a first reference image in response to determining the first unique laundry load is the first color.

19. The method of claim 18, wherein determining the first unique laundry load is the first color comprises:

determining that at least 80% of the first unique laundry load in the first unique image is not white.

* * * * *